United States Patent
Dvir et al.

(10) Patent No.: US 8,873,960 B2
(45) Date of Patent: Oct. 28, 2014

(54) TECHNIQUES FOR DETECTING OPTICAL FAULTS IN PASSIVE OPTICAL NETWORKS

(75) Inventors: Amiad Dvir, Nes-Ziona (IL); Eli Elmoalem, Nili (IL)

(73) Assignee: Broadcom Corporation, Irvine, CA (US)

( * ) Notice: Subject to any disclaimer, the term of this patent is extended or adjusted under 35 U.S.C. 154(b) by 502 days.

(21) Appl. No.: 13/189,935

(22) Filed: Jul. 25, 2011

(65) Prior Publication Data

US 2011/0280568 A1 Nov. 17, 2011

Related U.S. Application Data (63) Continuation-in-part of application No. 12/648,885, filed on Dec. 29, 2009.

(60) Provisional application No. 61/141,489, filed on Dec. 30, 2008.

(51) Int. Cl.
| | |
|---|---|
| *H04J 14/00* | (2006.01) |
| *H04J 3/16* | (2006.01) |
| *H04B 10/077* | (2013.01) |
| *H04J 3/14* | (2006.01) |
| *H04Q 11/00* | (2006.01) |
| *H04J 3/06* | (2006.01) |

(52) U.S. Cl.
CPC .......... *H04J 3/14* (2013.01); *H04Q 2011/0015* (2013.01); *H04J 3/0682* (2013.01); *H04J 3/1694* (2013.01); *H04B 10/0771* (2013.01); *H04Q 2011/0035* (2013.01); *H04Q 11/0067* (2013.01); *H04Q 2011/0083* (2013.01); *H04J 2203/006* (2013.01); *H04Q 2011/0081* (2013.01)
USPC .................... 398/71; 398/72; 398/70; 398/66; 398/10

(58) Field of Classification Search
CPC .......... H04B 10/0771; H04B 10/0791; H04B 10/032; H04J 3/14; H04J 3/1694; H04J 3/0682; H04J 2203/006; H04Q 11/0067; H04Q 2011/0015; H04Q 2011/0035; H04Q 2011/0083; H04Q 2011/0084; H04Q 2011/0094; H04Q 2011/0088
USPC ...................... 398/72, 71, 70, 67, 66, 63, 8, 5
See application file for complete search history.

(56) References Cited

U.S. PATENT DOCUMENTS

| | | |
|---|---|---|
| 6,868,232 B2 | 3/2005 | Eijk et al. |
| 6,975,586 B1 | 12/2005 | Yoshimura |

(Continued)

FOREIGN PATENT DOCUMENTS

GB 2 292 495 A 2/1996

OTHER PUBLICATIONS

International Telecommunication Union (ITU), ITU-T G.984.1, Series G: Transmission Systems and Media, Digital Systems and Networks, Gigabit-capable Passive Optical Networks (GPON): General Characteristics; Mar. 2008.

(Continued)

*Primary Examiner* — M. R. Sedighian
(74) *Attorney, Agent, or Firm* — Sterne, Kessler, Goldstein & Fox PLLC (57) ABSTRACT

A method for detecting faults and their locations in an optical path between an optical line terminal (OLT) of and optical network units (ONUs) of a passive optical network (PON). The method comprises forming a maintenance optical link through the PON between the OLT and a collocated ONU, the OLT and its collocated ONU are each connected to an optical splitter; sending a ranging request from the OLT to the collocated ONU; in response to the ranging request, receiving, over the maintenance optical line, a ranging burst signal including at least a fault analysis detection pattern (FADP); and analyzing the FADP in the received signal by auto-correlating the FADP signal with an expected FADP signal, an uncorrelated event measured through the auto-correlation is indicative of a fault in the optical path of the PON and occurrence times of such events are indicative of the fault's location in the optical path.

17 Claims, 9 Drawing Sheets

(56) References Cited

U.S. PATENT DOCUMENTS

| | | | |
|---|---|---|---|
| 6,980,287 B2 | 12/2005 | Renard et al. | |
| 7,167,237 B2 | 1/2007 | Shimizu et al. | |
| 7,181,142 B1 | 2/2007 | Xu et al. | |
| 7,428,382 B2 | 9/2008 | Soto et al. | |
| 7,715,718 B2 | 5/2010 | Smith et al. | |
| 8,050,554 B2 * | 11/2011 | Jang et al. | 398/13 |
| 8,306,421 B1 | 11/2012 | Mazuk et al. | |
| 8,331,784 B2 | 12/2012 | Mizutani et al. | |
| 8,655,167 B1 * | 2/2014 | Lam et al. | 398/21 |
| 2002/0109875 A1 | 8/2002 | Eijk et al. | |
| 2002/0109876 A1 | 8/2002 | Eijk et al. | |
| 2004/0196664 A1 | 10/2004 | Renard et al. | |
| 2006/0007426 A1 * | 1/2006 | Weller | 356/73.1 |
| 2007/0172239 A1 | 7/2007 | Yamazaki et al. | |
| 2007/0274717 A1 | 11/2007 | Xu et al. | |
| 2008/0031624 A1 | 2/2008 | Smith et al. | |
| 2008/0037981 A1 | 2/2008 | Mukojima | |
| 2008/0069564 A1 | 3/2008 | Bernard | |
| 2008/0131124 A1 | 6/2008 | Nam et al. | |
| 2009/0060496 A1 * | 3/2009 | Liu et al. | 398/17 |
| 2009/0067835 A1 | 3/2009 | Chen | |
| 2009/0115999 A1 | 5/2009 | Watte et al. | |
| 2009/0268197 A1 | 10/2009 | Perron et al. | |
| 2009/0274455 A1 | 11/2009 | Dvir et al. | |
| 2009/0290872 A1 | 11/2009 | Xu et al. | |
| 2009/0290875 A1 | 11/2009 | Xu et al. | |
| 2010/0166419 A1 | 7/2010 | Elmoalem et al. | |

OTHER PUBLICATIONS

International Search Report directed to related international Application No. PCT/IB2012/001675, dated Apr. 3, 2013, from the European Patent Office, Rijswijk, The Netherlands; 3 pages.

International Preliminary Report on Patentability with Written Opinion directed to related International Application No. PCT/IB2012/001675, dated Jan. 28, 2014, from The International Bureau of WIPO, Geneva, Switzerland; 7 pages.

* cited by examiner

TECHNIQUES FOR DETECTING OPTICAL FAULTS IN PASSIVE OPTICAL NETWORKS

CROSS REFERENCE TO RELATED APPLICATIONS

This application is a continuation-in-part of U.S. patent application Ser. No. 12/648,885 filed on Dec. 29, 2009. The 12/648,885 application claims the benefit of U.S. Provisional Application No. 61/141,489 filed on Dec. 30, 2008, the contents of which are herein incorporated by reference.

TECHNICAL FIELD

The present invention relates generally to passive optical networks (PONs), and more particularly to protection of such networks.

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include a Broadband PON (BPON), an Ethernet PON (EPON), a Gigabit PON (GPON), XGPON, and others.

Figure 1:
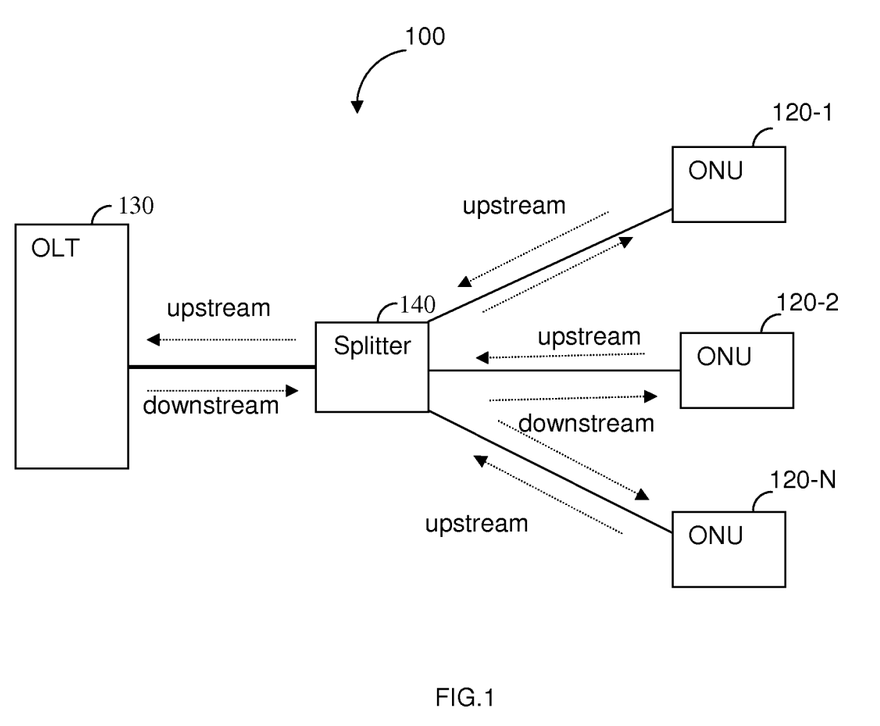
FIG. 1 is a schematic diagram of a PON.

An exemplary diagram of a typical PON 100 is schematically shown in FIG. 1. The PON 100 includes N ONUs 120-1 through 120-N (collectively known as ONUs 120) coupled to an OLT 130 via a passive optical splitter 140. In a GPON, for example, traffic data transmission is achieved using GPON encapsulation method (GEM) encapsulation over two optical wavelengths, one for the downstream direction and another for the upstream direction. Thus, downstream transmission from the OLT 130 is broadcast to all the ONUs 120. Each ONU 120 filters its respective data according to pre-assigned labels (e.g., GEM port-IDs in a GPON). The splitter 140 is 1 to N splitter, i.e., capable of distributing traffic between a single OLT 130 and N ONUs 120.

In most PON architectures, the upstream transmission is shared between the ONUs 120 in a TDMA based access, controlled by the OLT 130. TDMA requires that the OLT first discovers the ONUs and measures their round-trip-time (RTT), before enabling coordinated access to the upstream link. For example, in a GPON network, during initial set-up an ONU 120 and the OLT 130 may be in one of the following operational states: serial number acquisition or ranging. In the serial-number acquisition state, the OLT 130 tries to detect the serial number of an ONU 120. If the OLT 130 and an ONU 120 have not completed the serial number acquisition stage, due to a low power signal, the ONU 120 independently changes its optical power output until successful detection of the serial number. In the ranging state, the OLT 130 tries to determine the range between the terminal units (i.e., ONUs 120) to find out at least the round trip time (RTT) between OLT 130 and each of the ONUs 120. The RTT of each ONU 120 is necessary in order to coordinate a TDMA based access of all ONUs 120 to the shared upstream link.

During a normal operation mode, the range between the OLT 130 to the ONUs 120 may change over time due to temperature changes on the fiber links (which results with varying signal propagation time on the fiber). The OLT 130 continuously measures the RTT and adjusts the TDMA scheme for each ONU accordingly.

In order to enable protection in PONS a redundant optical link and OLT are connected to a splitter. This type of a configuration is usually referred to as a duplex PON system. An example for such a system is a protection type B, defined in ITU-T standard G.984.1. An illustration of a duplex PON 200 is provided in FIG. 2. As can be noticed two OLTs 210-1 and 210-2 are respectively connected via optical fibers 220-1 and 220-2 to a splitter 230. The splitter 230 splits incoming traffic to N ONUs 240-1 and 240-N. That is, in this example, the splitter 230 is a 2 to N splitter.

Figure 2:
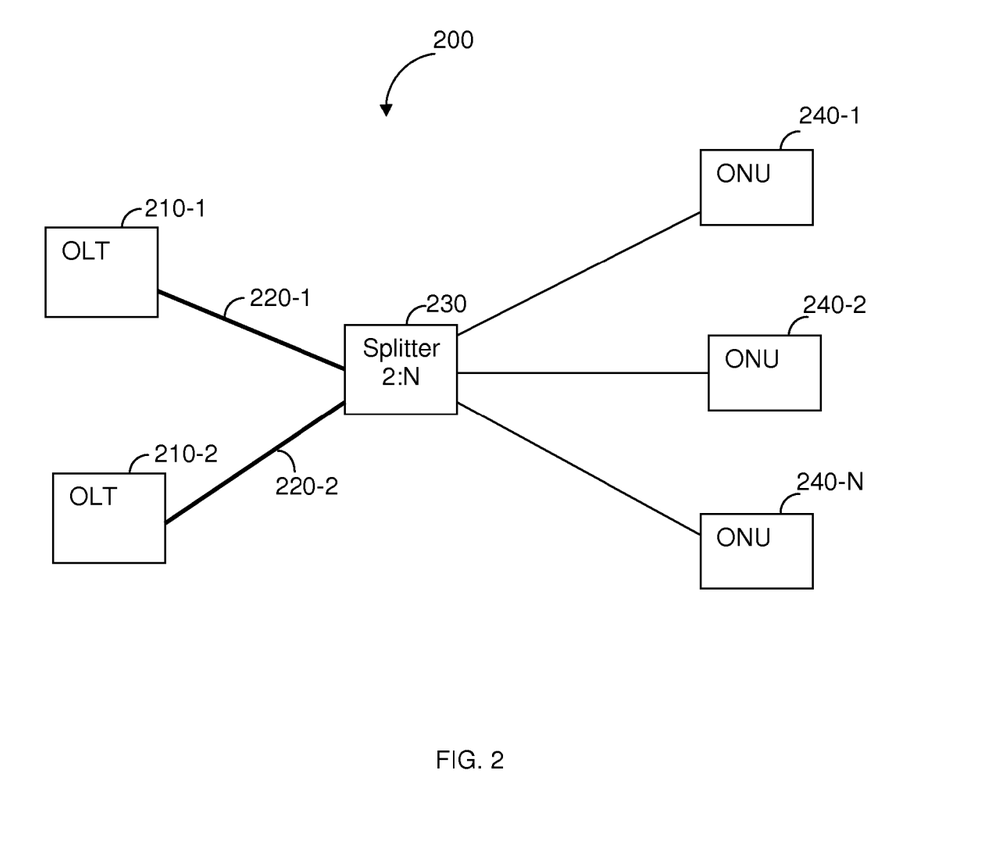
FIG. 2 is a schematic diagram of a conventional duplex PON.

In the duplex PON 200 one of the OLTs is set as active while the other as a standby. When there is a failure in the active OLT or its respective fiber a fail-over is performed and the operation is switched to the standby OLT and traffic is sent through its respective fiber. Typically, a synchronization link is established between the OLTs 210 to transfer database updates, PON status messages and switch-over trigger signals.

However, in order to ensure minimal service interruption due to a switch-over action, the standby OLT should perform at least the ranging process when turning into an active OLT. The lengths of the standby and active optical links are not the same. Performing such a process when establishing the network is an error prone approach as the "range" between the OLTs 210 and the terminal units (i.e., ONUs 240) may change over time and therefore there may be different RTT times and optical power levels for signals transmission power. Performing the ranging process for each ONU when switching-over is a time-consuming task and typically results with a long service interruption time, as the PON remains idle for the duration that the ranging process takes place.

In addition, the topology of the network may change over time. For example, an ONU may be added or removed from the network. Thus, the standby OLT should maintain updated information relating to the status of the PON, as acquiring such information when switching-over is a time consuming process through which the PON remains idle.

A protection mechanism should maintain a fast and reliable communication channel between the two OLTs, whether the active and standby OLTs 210 are collocated on the same shelf, rack, or reside in geographically remote sites. In addition, a logic unit controlling the protection mechanism should be continuously updated with the status of both the fiber links connecting the standby and active OLTs 210 to the splitter 230. Since the standby OLT (e.g., OLT 210-1) cannot transmit data on its link (e.g., 220-1) while is in standby mode, thus, it is necessary to monitor the standby OLT link before a switch-over operation.

In order to provide reliable operation of the PON, there is a need to identify faults that occur on the optical fibers of the PON, for example, detection of breaks or major attenuation, due to a bent fiber, for example. Additionally, in order to allow repairing a faulty optical fiber, there is a need to locate the exact location of a fault for a faster, more efficient network repairs.

It would be therefore advantageous to provide an efficient protection mechanism for PONs. It would be advantageous for detecting faults in the optical path between and OLT and ONUs using the protection mechanism.

SUMMARY OF THE INVENTION

Certain embodiments include herein include a method for detecting faults and their locations in an optical path between an optical line terminal (OLT) of and optical network units (ONUs) of a passive optical network (PON). The method comprises forming a maintenance optical link through the PON between the OLT of the PON and a collocated optical network unit (ONU), wherein the OLT and its collocated ONU are each connected to an optical splitter; sending a ranging request from the OLT to the collocated ONU; in response to the ranging request, receiving a ranging burst signal over the maintenance optical line, wherein the burst signal includes at least a fault analysis detection pattern (FADP); and analyzing the FADP in the received signal by auto-correlating the FADP signal with an expected FADP signal, wherein an uncorrelated event measured through the auto-correlation is indicative of a fault in the optical path of the PON and occurrence times of such events are indicative of the fault's location in the optical path.

Certain embodiments include herein also include a passive optical network (PON). The PON comprises an optical line terminal (OLT) serving as an OLT of the PON; a collocated optical network unit (ONU) collocated with the OLT, wherein the OLT and the ONU are electronically connected through a digital link; a plurality of ONUs serving as ONUs of the PON; an optical splitter for connecting the OLT and its collocated ONU to the plurality of ONUs, wherein a maintenance optical link is formed between the OLT and its collocated ONU through the optical splitter and the plurality of ONUs, wherein the OLT is configured to detect faults and their locations in an optical path between the OLT and the plurality of ONUs by: sending a ranging request to the collocated ONU over any one of the maintenance optical line and the digital connection; in response to the ranging request, receiving over the maintenance optical line a ranging burst signal including at least a fault analysis detection pattern (FADP); and analyzing the FADP in the received signal by auto-correlating the FADP signal with an expected FADP signal, wherein uncorrelated an event measured through the auto-correlation are indicative of a fault in the optical path between the OLT and the collocated ONU and occurrence times of such event is indicative of the fault's locations in the optical path.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
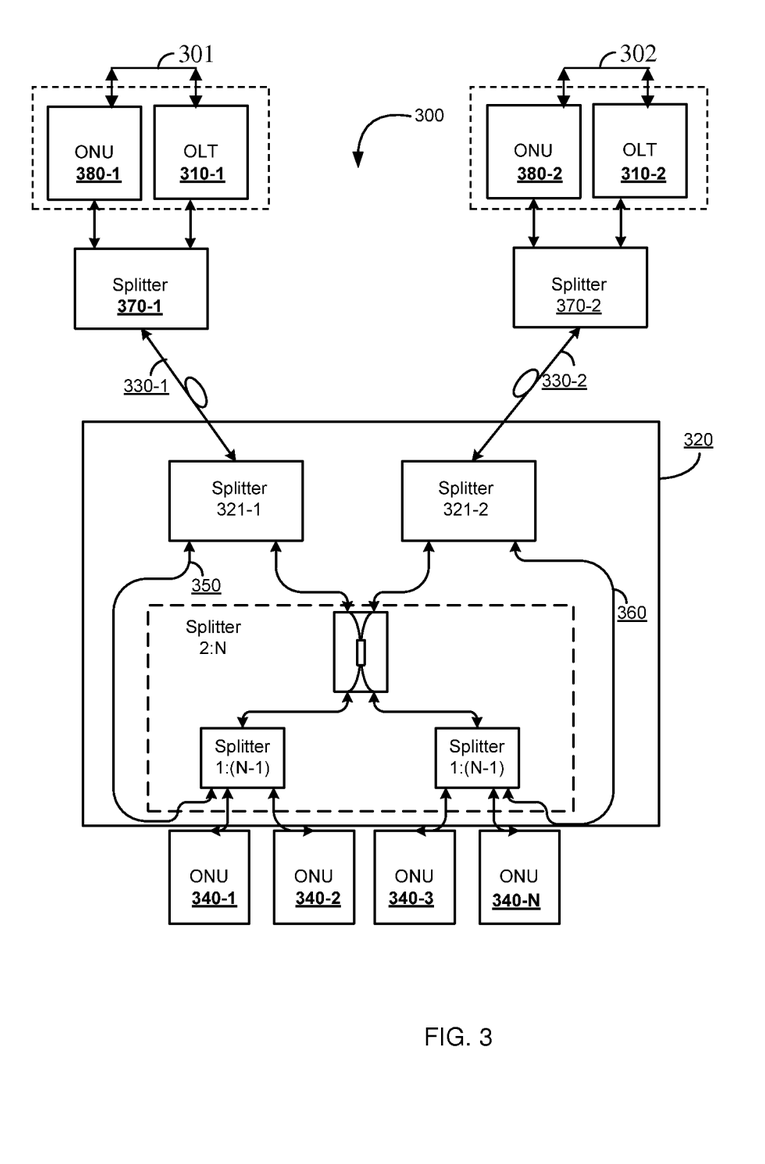
FIG. 3 is a schematic diagram of a duplex PON constructed in accordance with an embodiment of the invention.

FIG. 3 shows an exemplary block diagram of a duplex PON 300 constructed in accordance with an embodiment of the invention. The PON 300 includes two OLTs 310-1 and 310-2 respectively coupled to a splitter 321-1 or 321-2 via optical links (e.g., optical fibers) 330-1 and 330-2. The splitters 321-1 and 321-2 are coupled to a number of N ONUs 340-1 to 340-N (collectively ONU 340) where a single optical link connects the splitter and each of the ONUs 340. In the configuration of the PON 300 the optical links 330 as well as OLTs 310 are protected. That is, one OLT and its respective optical link (e.g., OLT 310-1 and optical link 330-1) are active while the other pair (e.g., OLT 310-2 an optical link 330-2) are standby.

In accordance with certain embodiments of the invention, two output optical links 350 and 360 respectively are coupled to two output ports of the splitters 321-1 and 321-2 to the OLT links 330-1 and 330-2, and then these ONU signals are coupled by splitters 370-1 and 370-2 to ONUs 380-1 and 380-2, which are respectively collocated with OLTs 310-1 and 310-2. This arrangement enables each OLT to control and manage all ONUs 340 and the ONU collocated to its peer OLT via the fibers 330 connecting the OLTs 310 to the splitter 320. For example, OLT 310-1 controls ONUs 340 as well as ONU 380-2.

The optical links 350 and 360, the splitters 370-1, 370-2, 321-1 and 321-2, and the fiber links 330 create a link (hereinafter "the protection maintenance link") between the OLTs 310 and the ONUs 380. The protection maintenance link is used for continuous calculation of the differential distance as will be described in greater detail below.

OLT 310 manages a collocated ONU function 380, which acts as any of ONUs 340. That is, an OLT 310-1 (e.g., active OLT) manages the ONU 380-2 collocated with the OLT 310-2 (e.g., standby OLT) and an active OLT 310-2 manages the ONU 380-2 collocated with the OLT 310-1. The OLT 310-1 and its collocated ONU 380-1 are connected using a digital connection 301. Similarly, the OLT 310-2 and its collocated ONU 380-2 are connected using a digital connection 302. Over the digital connection the OLT sends signals for at least controlling its respective collocated ONU.

The OLT 310-1 and collocated ONU 380-1 are connected to the splitter 320 through a 2:1 splitter 370-1 and the OLT 310-2 and collocated ONU 380-2 are connected to a 2:1 splitter 370-2. In an exemplary embodiment, the splitter 370-1 or 370-2 is used to multiplex both OLT signals and ONU signals on the same fiber. A non-limiting diagram of the splitters 370-1, 370-2, 321-1, and 321-2 constructed in accordance with an embodiment of the invention is provided in FIG. 6.

In accordance with one embodiment of the invention, both OLTs 310-1 and 310-2 include a database having the same information, synchronized between the OLTs. The databases maintain the updated round-trip time and PON related information. It should be appreciated by one of ordinary skill in the art that sharing such information between the OLTs 310-1 and 310-2 allows fast switch-over from an active link to a standby link, as the standby OLT does not require to acquire this information when switching-over.

In another embodiment of the invention, a synchronization link between the two OLTs 310-1 and 310-2 can be implemented over the protection maintenance link. The OLTs share updated round-trip time and PON related information. For example, this information includes progress reports of an ONU activation process, ONU alarms indications, learned passwords, RTT (or equalization delay) measurements, and switch-over trigger signals. In one embodiment of the invention the protection maintenance link between the OLTs can be exploited as a synchronization link. This is especially useful when, for example, the two OLTs reside in geographically remote sites.

As mentioned above in order to ensure fast protection switch-over, the ranging process should not be performed by the standby OLT when switching-over. With this aim, in accordance with an embodiment of the invention a "base differential distance" value is computed. The base differential distance is the differential distance of the OLTs 310 from a designated ONU 340 as measured during installation.

Figure 4:
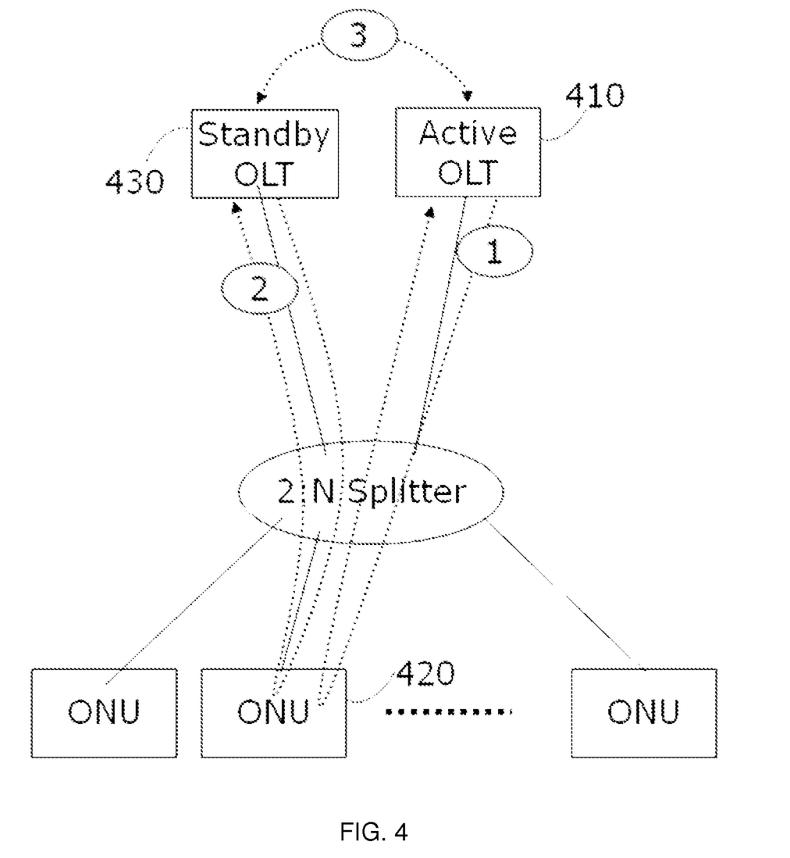
FIG. 4 is a diagram illustrating a process for measuring a differential distance.

As illustrated in FIG. 4 to measure a base differential distance, an active OLT 410 measures the RTT to a designated ONU 420 and then deactivates the ONU 420. Thereafter, a standby OLT 430 activates the ONU 420 and measures the RTT to the ONU 420 and then deactivates it. Finally, the OLTs 410 and 430 exchange the RTT measurements. The base differential distance is the difference between the RTT measurements. This process is performed at the installation of the PON. It should be noted that the measurement of the differential distance can be performed with any of the ONUs on the PON, including, as illustrated in FIG. 3, the ONU 380 collocated with the OLT 310. It should be further noted that the ranging process may be also performed after the installation of the PON, for example, when a new ONU is added to the network. In addition, the ranging process may be initiated when the system administrator wants to verify certain aspects of the ONU, like ONU interferences and stability of optical distance.

The standby OLT continuously measures and maintains an updated differential distance value as this value may change over time. In accordance with an embodiment of the invention, the differential distance $DiffRTT_{TS}(t)$ from a standby OLT to an ONU at a time 't' is computed as follows:

$$DiffRTT_S(t)=(RTT\_ONU_S(t)-BaseRTT\_ONU_S)+BaseDiffRTT_S$$

wherein a $RTT\_ONU_S(t)$ is a RTT value measured from the active OLT ($OLT_A$) to the ONU collocated with the standby OLT ($ONU_S$) at time 't', and the $BaseRTT\_ONU_S$ is the RTT measured from an $OLT_A$ to an $ONU_S$ at installation time, when $BaseDiffRTT_S$ is computed. The $RTT\_ONU_S(t)$ and $BaseRTT\_ONU_S$ are calculated using the protection maintenance link.

During normal operation of the PON, the active OLT ($OLT_A$) continuously monitors the RTT of the ONUs in the network, and measures the RTT(i,t) of an ONU 'i' at time 't'. These measures are periodically sent to the standby OLT over the synchronization link. When a switch-over occurs, the standby OLT becomes active, and calculates a new RTT value of ONU 'i', as follows:

$$New\text{-}RTT(i,t)=RTT(i,t)+DiffRTT_S(t)$$

This way, when the standby OLT becomes active, it can immediately provide services to the ONUs, using the New RTT values, and does not need to perform a ranging process.

Figure 5:
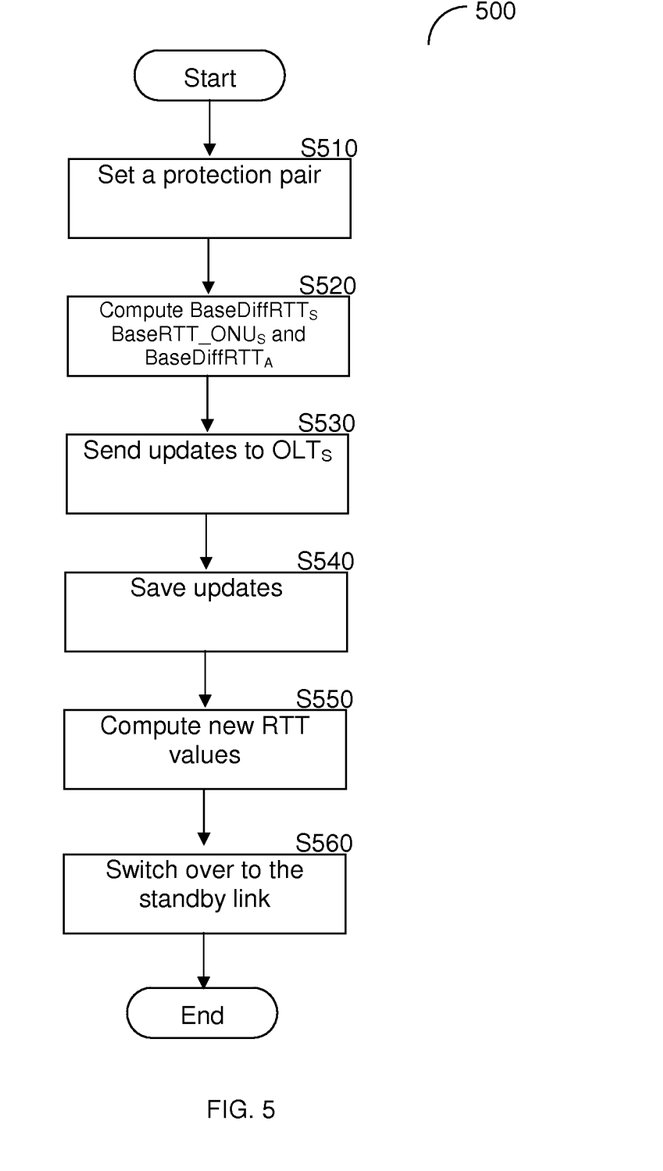
FIG. 5 is a flowchart describing a protection process implemented in accordance with an embodiment of the invention.

FIG. 5 shows an exemplary and non-limiting flowchart 500 describing the process for performing a protection in a PON implemented in accordance with an embodiment of the invention. The method is performed after the protection maintenance link and a synchronization link between the OLTs are established. As mentioned above the synchronization link can be established over the protection maintenance link.

At S510, the active and standby links are determined by setting each OLT 310 and each optical link 320 to their respective states. At S520, each link is activated, on its turn, to compute the base differential distance values ($BaseDiffRTT_S$ and $BaseRTT\_ONU_S$) as described in detail above. These values are used by the standby OLT when switching-over. In addition, the active OLT continuously calculates the $RTT\_ONU_S(t)$ values using the protection maintenance link.

At S530 during a normal operation of the PON, the active OLT sends over the synchronization link updated RTT and PON related information. This information includes, for example, progress reports of ONU activation process, ONU alarms indications, learned passwords, RTT(i, t) and $RTT\_ONU_S(t)$ measurements, and so on. At S540, upon receiving this information, the standby OLT saves the updates in its database. In one embodiment of the invention, a new RTT value is computed once the RTT(i, t) and $RTT\_ONU_S(t)$ measurements are received. The new RTT value is saved in the database.

At S550, as a switch-over is triggered, the standby OLT receives a switch-over signal, and thereafter computes the new RTT values for each ONUs as described in detail above. These values are computed using the RTT(i, t) and $RTT\_ONU_S(t)$ measurements. In the case where the new RTT value is already saved in the database, then upon triggering a switch-over, this value is retrieved from the database and the computation step (S550) is not performed. Subsequently, at S560, the standby OLT starts to transmit data to the ONUs over its respective link. That is, the active link and standby link initially set at S510 are switched.

There are various faults that can trigger a switch-over of the standby link to become active. These faults include, but are not limited to, loss of signal (LOS)/loss of frame (LOF) of an active link, a faulty OLT (e.g., OLT's transceiver), loss of a communication channel between the OLT due to, for example, detection of breaks or major attenuation occurs on the optical fiber, and so on. The switch-over may also be triggered manually by a user, e.g., a network administrator.

In certain exemplary embodiments of the invention, the control of the protection mechanism can be either centralized or distributed. A switch-over decision is based on the various faults and link-status information. The failover mechanism is continuously updated with regard to the status of each of the OLT links using the collocated ONU connected to the standby link. It should be noted that in certain embodiments such configuration is required as a standby OLT cannot communicate over its fiber.

Figure 6:
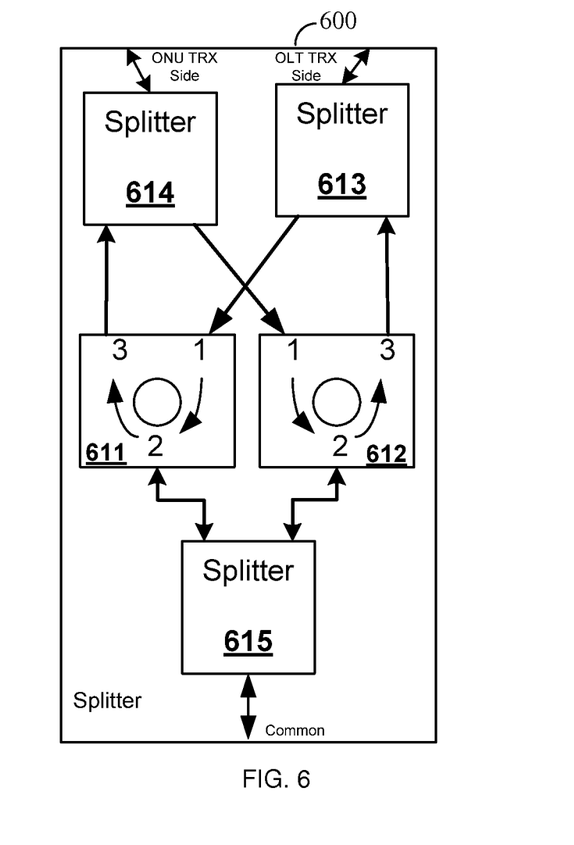
FIG. 6 is a diagram of an optical splitter constructed in accordance with an embodiment of the invention.

FIG. 6 shows an exemplary diagram of an optical splitter 600 constructed in accordance with an embodiment of the invention. The optical splitter 600 is based on two optical circulators 611 and 612. An optical circulator is a three-port device that allows light to travel in only one direction. That is, from port 1 to port 2, or from port 2 to port 3, but not from port 1 to port 3. The optical circulator 611 is coupled to wavelength splitters 614 (port 3), 615 (port 2), and 613 (port 1). A signal from the wavelength splitter 613 is received at port 1 and output at port 2 of the circulator 611. A signal received at port 2 of the circulator 611 (from the splitter 615) is transferred to the splitter 614 via port 3 of the circulator 611. In a similar manner, the optical circulator 612 is coupled to wavelength splitters 613, 614 and 615. A signal from the wavelength splitter 613 is received at port 1 and output at port 2 of the circulator 612. A signal received at port 2 of the circulator 612 is transferred to the splitter 613 via port 3 of the circulator 612. In accordance with an embodiment of the invention the 2:N splitters 370-1, 370-2, 321-1, and 321-2 are implemented using the 2:N optical splitter 600.

As mentioned above the splitter 600 can be connected in the protection system 300 shown in FIG. 3 as any of the splitters 370-1, 370-2, 321-1, and 321-2. Therefore, the splitter 600 connected in the optical path should separate between two different wavelengths transmitted in the upstream and downstream direction. For example, in GPON, in the upstream direction, the OLT generates an optical signal of 1480 nm to 1500 nm (as referred to 15XY) and the downstream direction each ONU transmits an optical signal of 1260 nm to 1280 nm (also referred to as 13XY). As illustrated in FIG. 3, the wavelength splitter 613 is connected to the OLT while the wavelength splitter 614 is connected to the ONU. Thus, the output of the wavelength splitter 613 is to the circulator 611 only 15XY optical signal. The wavelength splitter 614 outputs to the circulator 612 only 13XY optical signal.

According to certain embodiments of the invention, the teachings disclosed herein can be utilized to identify faults that occur on the optical fibers of the PON. In addition, to allow faster repairing of a faulty optical fiber the identification includes the exact the location of the fault. Thus, the failover mechanism can be continuously updated with regard to the status of each fiber linking the ONUs and OLTs, illustrated, for example, in FIG. 3.

Figure 7:
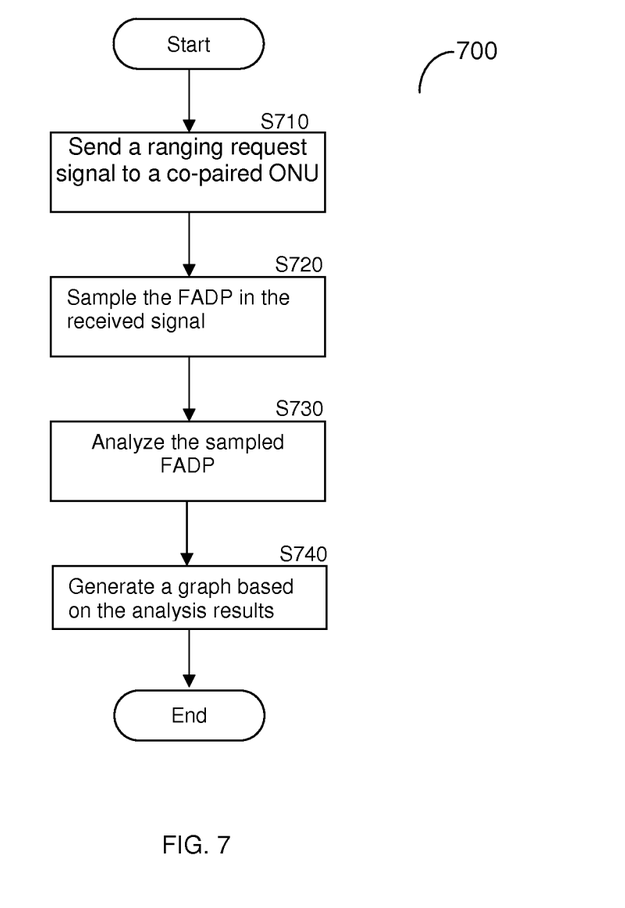
FIG. 7 is a flowchart describing a process for detecting faults in an optical path of a PON in accordance with an embodiment of the invention.

FIG. 7 is a non-limiting and exemplary flowchart 700 illustrating the method for detecting faults and their exact locations in an optical path in a PON according to an embodiment of the invention. The method will be described with a reference to the duplex PON 300 shown in FIG. 3 and is based on the ranging and RTT measures described in detail above.

The method can identify a fault in any location in the optical path of the protection link, i.e., OLT-1/ONU 380-1 to the OLT 310-2/ONU 380-2 via the splitter 370-1, fiber 330-1, splitter 320, fiber 330-2, and splitter 370-2. In addition, the method can identify a fault in any location in the optical path between an active OLT and the ONUs 240. That is, the optical path from the OLT 310-1, splitter 370-1, fiber 330-1, splitter 320, and the ONUs 340. Alternatively, if the OLT 310-2 is active, the optical path is OLT 310-2, splitter 370-2, fiber 330-2, splitter 320, and the ONUs 340.

At S710, a ranging process is initiated between the OLT 310-1 and its collocated ONU 380-1. That is, the OLT 310-1 requests to range the ONU 380-1 by sending a ranging request signal to the ONU 380-1. The request signal includes a set of consecutive grants allocated only to the ONU 380-1. Thus, during the ranging process all other ONUs 340, 380-2 are in a quite mode and do not transmit data to the OLT 310-1. The ranging request signal is defined in the GPON standard ITU-T G.984.2. The request can be sent over the digital connection between the OLT and its collocated ONU or over the maintenance link.

As mentioned above, a ranging process can be performed during the installation of the PON and during normal operation of the PON, for example, when a new ONU is added to the network, or upon re-activation of an ONU. The ranging process can be also initiated by a system administrator.

Figure 8:
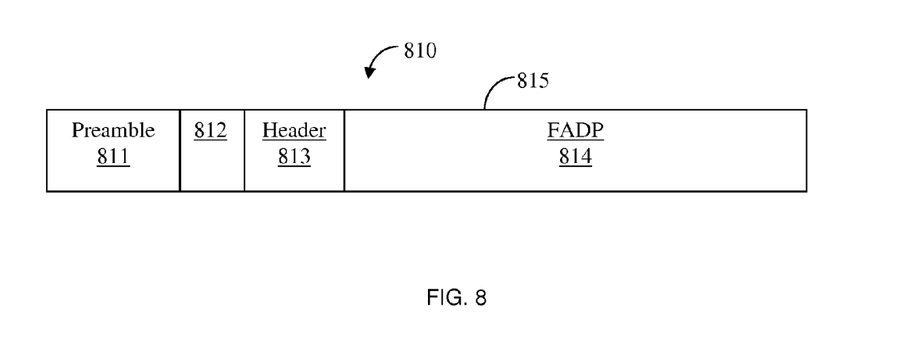
FIG. 8 is a diagram illustrating the structure of a packet of a ranging burst signal.

The ONU 380-1 responds to the ranging request by sending a ranging burst signal to the OLT 310-1. As illustrated in FIG. 8, a packet 810 of the ranging burst signal includes, in part, a preamble 811, a delimiter 812, a header 813 designating at least an identifier (ID) of the ONU 380-1, and a fault analysis data pattern (FADP) 814, which is included in the payload portion 815.

The structure of the ranging burst signal is defined in the GPON standard. However, the FADP is generated according to certain embodiments of the invention, as will be described herein below with reference to FIG. 9. The FADP 814 is a low rate data pattern including high frequency components. The FADP 814 satisfies the requirements of the GPON standard, but at the same time, can be analyzed by the OLT 310-1 to identify faults' and their locations in the optical paths mentioned above. For example, the FADP 814 maintains the GPON's consecutive identical digits (CID) requirements of, e.g., CID <72 bits and the transmission rate of the FADP 814 is as the allowable upstream data-rate in a GPON.

Figure 9:
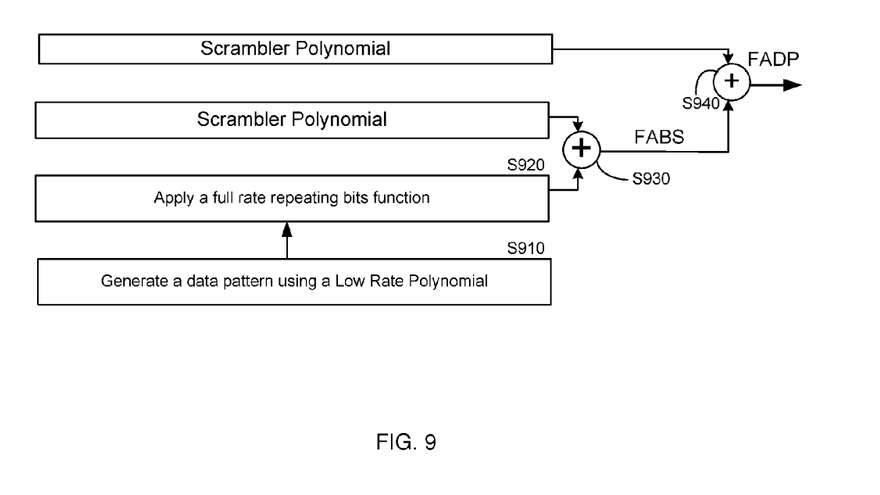
FIG. 9 is a diagram illustrating the process for generating a fault analysis data pattern (FADP) according to an embodiment of the invention.

FIG. 9 shows an exemplary diagram illustrating the process for generating the FADP 814 according to an embodiment of the invention. At S910, a data pattern is generated using a low rate polynomial. In an embodiment of the invention, this polynomial is selected from a group of polynomials designed for generating a pseudorandom binary sequence pattern (PRBS). At S920, a full rate repeating bits function is applied on the data pattern generated at S910. The number of bit repetitions is defined by a sub-rate parameter. For example, if the data pattern (PRBS) is '101100' and the sub-rate parameter is 1/4, then the output of S920 is the following binary pattern: 111100001111111100000000. That is, each bit in the data pattern of S910 is repeated 4 times.

At S930, the generated bit sequence is bit-wise-XORed with a bit sequence generated by a scrambler polynomial. The scrambler polynomial may be a burst-synchronous, for example, $x^7+x^6+1$. A bit-wise-XOR operation is a XOR operation between two respective bits in two different bit sequences. The result of S930 is a high rate bit sequence (hereinafter the fault analysis bit sequence (FABS)).

At S940, the FABS is bit-wise-XORed with a binary sequence generated by a scrambler polynomial, which is the same polynomial used to produce the FABS. This scrambling operation is mandatory by the GPON standard. Thus, performing the bit-wise-xor operation twice on the same bit sequence (generated by the same scrambler polynomial) cancel the operation of each other. That is, if operation S930 results in a high data-rate bit sequence, then the operation S940 lowers the data-rate of the FABS, to result in the FADP 814. Thus, the FADP 814 included in the payload is as the data pattern generated at S920. In addition, the FADP 814 is at a lower data-rate than the FABS or normal GPON upstream data. Referring back to the above example, the FADP 814 will be 111100001111111100000000.

Returning to FIG. 7, at S720, upon receiving the ranging burst signal, the OLT 310-1, samples the FADP 814 in the received signal. In one embodiment, this is performed by sampling the signal at the OLT receiver at the input of the limiting amplifier, thus maintaining the analog properties of the received signal and the FADP included therein.

At S730, the sampled FADP is analyzed to detect faults in one of the optical paths mentioned above and the exact locations of such faults. It should be noted that the location of a fault can be identified at any point at any of the fiber (e.g., 200 meters from OLT 310-1 on fiber 330-1) and at any of the optical elements in the path, e.g., optical connectors, splitters, and so on.

According to an embodiment of the invention, the analysis is performed using a time shift auto-correction function between a received FADP signal and the expected FADP signal. The analysis is repeated for N required bit-shifts, where the signals are shifted one relative to the other representing all possible measured delays of the PON. In one embodiment, the expected signal is delayed with respect to the received signal. The auto-correlation process utilized during the signal analysis may be defined as one of following:

AutoCorrelation (Ti)=sum of (RX_FADP bit-wise-xor Exp_FADP(Ti))

or

AutoCorrelation (Ti) {analog amount}=sum of ((RX_FADP bit-wise-xor (analog Exp_FADP (Ti)))

where, RX_FADP is the received FADP signal and the Exp_FADP is the expected received FADP signal. The Auto-Correlation is a vector having a length of the FADP. The value of the AutoCorrelation (Ti) can be indicative of the conditions of the optical path at point C*Ti/2 (C is the speed of light).

According to an embodiment of the invention, the Exp_FADP is bit-shifted N times, i.e., i=0, . . . , N−1, where N is the number of bits in the FADP 814. The number N also represents the length of the fiber in quantities of bit length. The total time shift is a round trip time (RTT) that takes a signal sent from the ONU 380-1 to reach the OLT 310-1, this time is a function of the length of the optical path.

In an embodiment of the invention, the parameter N is a configurable parameter (based on the length of the pattern generated at S910) that can determine the resolution of the test. For example, if the length of the optical path is 1.5 KM, then the RTT (i.e., the total shift time) is 1 microsecond, and N is set to 100, then the resolution of the test is 15 meters (1.5 KM/100). To provide a higher test resolution, a longer data pattern is generated (at S910, FIG. 9). Thus, increasing the value N, e.g., to 1000, faults at a resolution of 1.5 meters can be detected. It should be noted that the resolution can be determined by setting the rate of FADP 814, e.g., by changing the sub-rate parameter at S920.

The measured autocorrelation at any Ti represents the reflected power from a location in the optical path respective of the $i^{th}$ shifted bit. According to an embodiment of the invention, the value of the AutoCorrelation function at time Ti may be compared to a value that indicates normal or acceptable behavior at a location on the optical path (respective of time Ti), and any deviation is a fault indication. It should be noted that the measured correlation represent values (i.e., reflected power) that are above or below the norm represent different faults in the optical path. For example, higher reflected power values may be indicative of a flattened fiber, while reflection values lower than the norm are indicative of attenuations in the fiber, due to for example, bends, bad splices, direct connectors or a fiber cut.

At S740, a graph representative of the autocorrelation function results is generated. Any non-auto correlated results are noticeable on the graph (e.g., as blips) and are indicative of faults in the optical path.

Figure 10A:
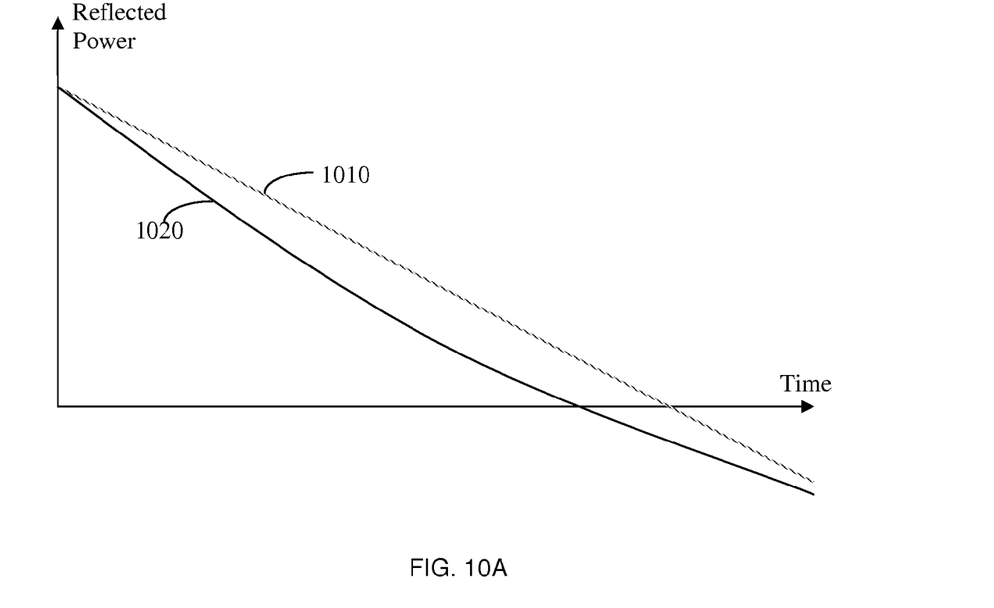
FIGS. 10A and 10B show graphs of the power of retuned signal over time as generated using an embodiment of the invention.
Figure 10B:
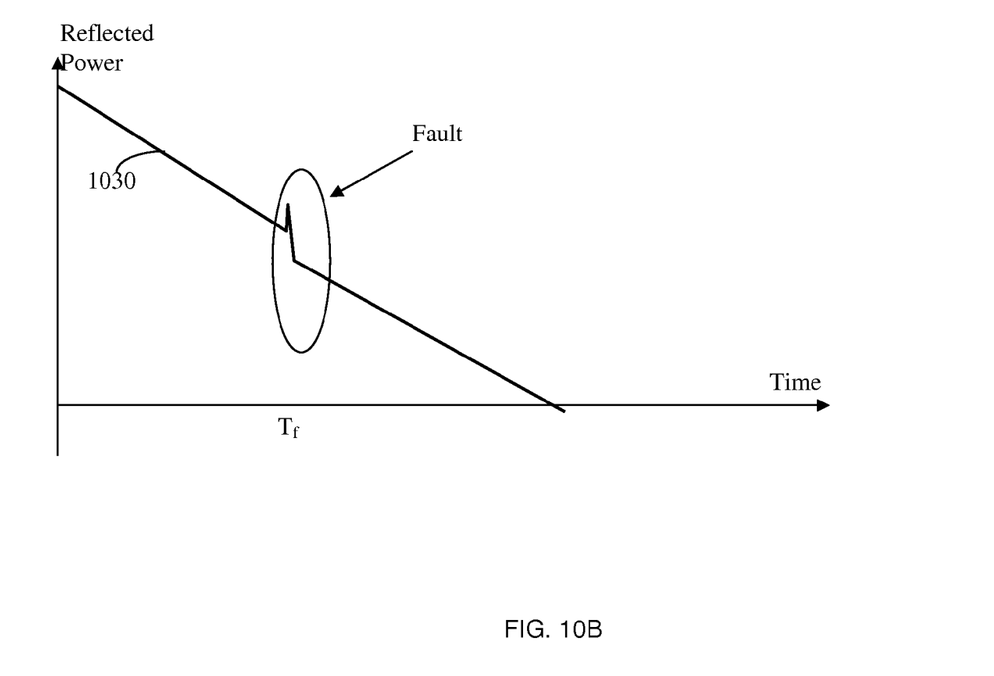

FIG. 10A shows graphs 1010 and 1020 that are examples for possible normal autocorrelation of the received and expected signals. FIG. 10B depicts a graph 1030 showing a blip at time Tf. This indicates a fault in the optical path that may be a result of, for example, a bad connector that returns some of the power. The location of the fault is at $(C*T_f)/2$, f=0, 1, . . . N−1. Examples for other faults that can be detected include a cat fiber, a flattened fiber, bends in the fiber, dirty connections, and so on.

It should be appreciated that as the ranging burst signal including the FADP is transmitted using an upstream wavelength of the PON (e.g., 13XY) and the ranging request signal is transmitted using downstream wavelength of the PON (e.g., 15XY), there is no need to utilize different wavelengths for detecting faults and/or change the structure of the transceivers in the ONU 380-1 and OLT 310-1.

It should be noted that the method can be performed by any active pair of ONU and OLT. That is, ONU 380-1 and OLT 310-1 or ONU 380-2 and OLT 310-2. It should be further noted that the invention described herein can be adapted to implement efficient protection mechanisms in any type of a PON including, but not limited to, a BPON, an EPON, and a GPON. Furthermore, the teachings of the invention can be adapted to implement a protection of more than two links.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting faults and their locations in an optical path between an optical line terminal (OLT) and optical network units (ONUs) of a passive optical network (PON), comprising:

forming a maintenance optical link through the PON between the OLT of the PON and a collocated ONU, wherein the OLT and its collocated ONU are each connected to an optical splitter;

sending a ranging request from the OLT to the collocated ONU;

in response to the ranging request, receiving a ranging burst signal over the maintenance optical link, wherein the received ranging burst signal includes at least a fault analysis detection pattern (FADP); and analyzing the FADP in the received ranging burst signal by auto-correlating the FADP signal with an expected FADP signal, wherein an uncorrelated event measured through the auto-correlation is indicative of a fault in the optical path of the PON and an occurrence time of the uncorrelated event is indicative of a location of the fault in the optical path.

2. The method of claim 1, wherein the FADP is a low data-rate signal that includes high frequency components.

3. The method of claim 2, wherein the FADP meets upstream data requirements of the PON.

4. The method of claim 3, wherein the PON is at least a gigabit PON (GPON) and XGPON.

5. The method of claim 2, wherein the FADP is generated by the collocated ONU.

6. The method of claim 5, wherein generating the FADP comprises:
generating a data pattern using a low rate polynomial;
applying a full rate repeating bits function on the data pattern to generate a first bit sequence;
performing a first bit-wise-xor operation between the first bit sequence and a second bit sequence generated by a scrambler polynomial to generate a fault analysis bit sequence (FABS); and
performing a second bit-wise-xor operation between the FABS and a third bit sequence generated by the scrambler polynomial to produce the FADP.

7. The method of claim 6, wherein the same scrambler polynomial with the same position within the scrambler polynomial is used in both the first and second bit-wise-xor operations.

8. The method of claim 6, wherein the low rate polynomial is selected from a group of polynomials designed for generating a pseudorandom binary sequence pattern (PRBS).

9. The method of claim 1, wherein auto-correlating the received FADP signal with the expected FADP signal comprises:
summing a result of a bit-wise-xor operation between the received FADP signal with a bit-shifted expected FADP signal.

10. The method of claim 9, wherein the bit-shifted expected FADP signal is bit-shifted N times, where N is a number of bits in the FADP.

11. The method of claim 9, wherein the summed result of the bit-wise-xor operation represents a reflected power from a location in the optical path respective of the i-th bit-shifted, wherein i is any integer between zero and N−1.

12. The method of claim 11, wherein an abnormal summed result represents an uncorrelated event, wherein the abnormal summed result is with reference to a faultless optical path.

13. The method of claim 9, wherein analyzing the FADP signal comprises:
generating a graph including summed results for each bit-shift; and
comparing the generated graph to a graph indicating a normal behavior of the optical path.

14. The method of claim 13, wherein a detected fault includes at least one of a damaged optical fiber, a bend in the optical fiber, a bad splice, dirty connectors, and a fiber cut.

15. The method of claim 1, wherein the ranging request is sent over one of the maintenance optical link and a digital connection between the OLT and the collocated ONU.

16. A passive optical network (PON), comprising:
an optical line terminal (OLT);
a collocated optical network unit (ONU) collocated with the OLT, wherein the OLT and the ONU are electronically connected through a digital link;
a plurality of ONUs serving as ONUs of the PON;
an optical splitter for connecting the OLT and its collocated ONU to the plurality of ONUs, wherein a maintenance optical link is formed between the OLT and its collocated ONU through the optical splitter and the plurality of ONUs, wherein the OLT is configured to detect faults and locations of the faults in an optical path between the OLT and the plurality of ONUs by:
sending a ranging request to the collocated ONU over one of the maintenance optical link and the digital connection;
in response to the ranging request, receiving over the maintenance optical link a ranging burst signal including at least a fault analysis detection pattern (FADP); and
analyzing the FADP in the received signal by auto-correlating the FADP signal with an expected FADP signal, wherein an uncorrelated event measured through the auto-correlation is indicative of a fault in the optical path between the OLT and the collocated ONU and an occurrence time of the uncorrelated event is indicative of a location of the fault in the optical path.

17. The PON of claim 16, wherein the optical splitter allows an optical signal from the collocated ONU to travel to the OLT through only the maintenance optical link, and an optical signal from one of the plurality of ONUs to travel only to the OLT through the optical path.

* * * * *

UNITED STATES PATENT AND TRADEMARK OFFICE
CERTIFICATE OF CORRECTION

| | | |
|---|---|---|
| PATENT NO. | : 8,873,960 B2 | Page 1 of 1 |
| APPLICATION NO. | : 13/189935 | |
| DATED | : October 28, 2014 | |
| INVENTOR(S) | : Dvir et al. | |

It is certified that error appears in the above-identified patent and that said Letters Patent is hereby corrected as shown below:

On the Title Page, Item (65), Prior Publication Data, insert
--US 2011/0280568 A1   November 17, 2011--.

On the Title Page, Item (63), insert --Related U.S. Application Data--.

Signed and Sealed this
Twenty-fourth Day of March, 2015

Michelle K. Lee
*Director of the United States Patent and Trademark Office*